ns, polyisobutylene resins, phenolated terpene and petroleum resins.

United States Patent Office 3,246,049
Patented Apr. 12, 1966

3,246,049
PRESSURE SENSITIVE ADHESIVE COMPRISING AN ISOCYANATE CROSS-LINKED POLYESTER OF CASTOR OIL AND DIGLYCOLIC ACID, AND TAPE COATED WITH SAID ADHESIVE
Charles S. Webber, Loudonville, N.Y., assignor to Norton Company, Troy, N.Y., a corporation of Massachusetts
No Drawing. Filed Aug. 30, 1963, Ser. No. 305,839
6 Claims. (Cl. 260—829)

This application is a continuation-in-part of my earlier co-pending application Serial No. 63,609, filed October 19, 1960, and now abandoned.

This invention relates to improved pressure sensitive adhesive sheet material and to improved adhesives and saturants therefor.

It is an object of the present invention to provide a pressure sensitive adhesive and tapes made therewith which are solvent-resistant, non-narcissistic, operable in a broad temperature range, and resistant to ultraviolet light, oxygen and ozone attack.

It is a further object to provide an improved pressure sensitive adhesive coated sheet material which is particularly suitable for use as a protective covering which provides protection from harm due to handling; and provides protection against a corrosive or otherwise harmful or contaminated exterior atmosphere.

The sheet material of the invention is a clear tough transparent film having a smooth thin coating on one side thereof of an adhesive of high transparency and cohesiveness, but with only moderate tack to itself as well as to other surfaces such as wood, plastics, paint and metal. The adhesives of the present invention leave no deposit when the coated film is stripped from an object which it contacts, and may be repeatedly replaced thereon without producing an adhesive deposit. Unlike the rubber based pressure sensitive adhesives of the prior art containing resinous tackifiers the adhesive masses involved in the present invention are non-narcissistic. That is they have no greater affinity for surfaces coated with the adhesives of this invention than for ordinary surfaces. Furthermore, they contain no sulfur or sulfur bearing materials which are present in many rubber based adhesives and which corrode silver and copper. The novel adhesives of this invention are not degraded by copper and brass as are rubber based pressure sensitive adhesives on extended contact. The adhesives of my invention are stable in the presence of ultraviolet radiation which causes serious deterioration of the ordinary rubber based adhesives.

When two adhesive coated surfaces of the present invention are brought into face to face contact they may be separated again with no more force than 5–25 oz./inch with no permanent disruption of the surface, no legginess and no pick-off whereas rubber-resin based adhesives frequently weld tightly and are completely disrupted when separated.

The present invention depends upon the discovery that pressure sensitive adhesives of novel properties and characteristics can be made from polyurethanes. While polyurethanes have found some use as ordinary thermosetting adhesives, their propensity to continued curing even at room temperatures have kept them from consideration as pressure sensitive adhesives.

However, it has now been found that by the interaction of a polyisocyanate and a polyol ester prepared from castor oil and diglycolic acid as described below, a product is obtained which can be utilized either alone or in combination with other ingredients such as tackifiers as a pressure sensitive adhesive of unusual properties.

When required, any of the well known tackifier resins commonly employed in rubber based pressure sensitive adhesives may be employed in the polyurethane adhesives of my invention. However, it is preferable to use tackifiers with little or no reactive hydrogen such as hydrogenated rosin esters, polyterpene resins, cumar-indene resins, polyisobutylene resins, phenolated terpene and petroleum resins.

These pressure sensitive adhesives have vastly superior solvent resistance as compared with the usual rubber-resin pressure sensitive adhesives and in addition shown superior resistance to ultraviolet light and to oxygen and ozone. One of the most important characteristics of these pressure sensitive adhesives is their ability to adhere firmly to non-fibrous films without the need for an interposed primer. Also, since these adhesives have very low adhesion to themselves, i.e. are non-narcissistic, they are of great value for making double-face adhesive tapes which can be rolled upon themselves without the use of the conventional liners. Further, these adhesives remain aggressively tacky and cohesive from 0° F. to over 300° F., whereas rubber based pressure sensitive adhesives range in usefulness generally from about 32° F. to 275° F.

The following formulations are illustrative examples of the novel adhesives of my invention:

|  | A | B | C | D | E |
|---|---|---|---|---|---|
| Castor oil diglycolate | 100 | 100 | 100 | 100 | 100 |
| Newport "S" (a phenolated terpene resin) | 50 | 37.5 | 25 | 12.5 | 0 |
| Nacconate #310 (a diisocyanate cross-linking agent) | 10 | 10 | 10 | 10 | 10 |

The castor oil ester is preferably formed by heating the castor oil and acid in the desired amounts in a vessel equipped with a reflux condenser with an azeotrope such as xylene employed as a solvent. The condenser is equipped with a trap to remove water as formed in the reaction. The reaction temperature rises slowly throughout the reaction as some of the xylene is lost in the nitrogen or carbon dioxide used to sweep air out of the reaction vessel. The normal range may be from 134° to 200° C. when xylene is the solvent. The reaction is preferably terminated when essentially no more water comes over and the acid number has approached an equilibrium at a value below 30. Additional reactants such as ethylene glycol, propylene glycol, butylene glycol, diethanolamine and similar polyols can be employed in the reaction mixture in small amounts.

The ratio of the diglycolic acid to the castor oil in the esterification should be in the range of 0.3 to 0.9 equivalent to one equivalent of the castor oil but preferably should be in the range of 0.5 to 0.8 diglycolic acid to one of castor oil. The reaction is followed by measuring the water condensed in a Dean-Stark trap and by determining the acid number of the reaction mixture which should finally be less than 30 and preferably less than 10. The viscosity of the resultant condensation product may lie within the range of 5,000 to 35,000 centipoises at 25° C. but preferably between 8,000 to 25,000 centipoises at 95 to 97% solids. The Rast molecular weight of the castor oil diglycolic polyol is in the range of 1,200 to 2,100 number average. The hydroxyl number of the polyol from castor oil and diglycolic acid is in the range of 40 to 90, preferably 50 to 70.

The esterification of the castor oil with diglycolic acid is carried out to increase the molecular weight, plasticity value and to increase the coherence strength of the resulting polyurethane which would be of little value for pressure sensitive tape use if the castor oil was not increased in molecular weight by esterifying with diglycolic acid to at least a 50% diester, preferably 85% diester before forming the polyurethane adhesive product.

The polyurethane pressure sensitive base or saturant is produced by adding a diisocyanate or polyisocyanate to the castor oil diglycolate with or without catalysts of the class consisting of diamines, polyamines, particularly secondary and tertiary amines. The catalysts reduce the pot life of the compositions resulting in a gelled uncoatable mass if retained too long at normal room temperatures, but does permit curing even at room temperature over an extended period of time of 16 to 48 hours.

If castor oil is substituted for the diester of castor oil and the required quantity of diisocyanate is added to react all of the hydroxyl groups, one obtains a semi-liquid polymer of no value as a pressure sensitive adhesive because its cohesive strength is of a very low order and therefore transfers to other surfaces when applied and removed as a piece of tape. Consequently, the quantity of free castor oil in the composition used to prepare the polyurethane pressure sensitive adhesive or saturant is limited as indicated by the viscosity and hydroxyl number as specified hereinbefore.

The above compositions are coated (with suitable solvents such as xylene) and then cured in situ on the desired backing. In contrast to rubber based pressure sensitive adhesives, no primer coat is required to anchor the adhesive on the film or web. Likewise, and surprisingly, no adhesion repellent or release coat is required on the backside of the tape to prevent "freezing" of the tape when wound upon itself in roll form.

A preferred film base for my novel adhesives is a polyester film such as Mylar (a polyester based on ethylene glycol and dimethyl terephthalate). Other suitable films are nylon, Saran, Genotherm (unplasticized polyvinyl chloride), polyethylene, polypropylene, cellulose acetate and cellophane.

The aggressiveness of the tack of the above adhesive compositions after curing at 250° for 20 minutes decreases from A to E.

The tack may also be controlled by the ratio of the diisocyanate to the polyol, the higher the diisocyanate content, the lower the tack. The most useable range is from between 5% and 10% of a diisocyanate such as Mondur CB-60 (a condensation product of trimethylol propane and toluene diisocyanate), 3,3'-dimethyldiphenylmethane-4,4'-diisocyanate (Nacconate #310 or Hylene DMM) or 3,3'-bitolylene-4,4'-diisocyanate (Nacconate #200). Other di or poly isocyanates may be used but the pot life of the composition is longer if both or all of the isocyanate groups are ortho to a methyl group on a benzene ring.

Further examples of the adhesives of the present invention illustrating the use of a diamine accelerator are:

|  | F | G | H | I | J | K |
|---|---|---|---|---|---|---|
| Castor Oil Diglycolate [1] | 200 | 200 | 200 | 200 | 200 | 200 |
| Mondur CB–60 [2] | 30 | 30 | 25 | 30 | 30 | 28 |
| Methyl Isobutyl Ketone | 50 | 50 | 50 | 100 | 100 | 50 |
| Triethylenediamine | 0.6 | 0.6 | 0.5 | 0.6 | 0.6 | 1 |
| Newport "S" Resin [3] (50% in toluene) | 100 | 150 | 50 | 50 | 50 | 130 |
| Adiprene L [4] |  |  |  | 50 | 100 | 80 |

[1] Viscosity—"Z" 3½ (Gardner).
[2] Mobay Chemical Co. (Prepolymer of tolylene diisocyanate and trimethylolpropane).
[3] Newport Industries alpha pinene polymer.
[4] Polyurethane made by E. I. du Pont.

The formulations were cast on a polyester film with a doctor setting of 0.010" and cured for 20 minutes at 175° F. Examples F, G, H and K had higher quickstick than I and J; i.e., F—615 g./in., G—860 g./in., H—350 g./in., I—285 g./in., J—280 g./in. and K—375 g./in., illustrating the variation in the physical properties of the adhesives that can be obtained by changing the composition. The Adiprene L, although a polyurethane, distinctly lowers the quickstick adhesion of our preferred compositions and could not be used alone because of inferior adhesive quality.

In any case the quantity of isocyanate groups in the composition should not be so great as to combine with all of the free hydroxyl groups in the castor oil polyester. Free hydroxyls must still be present to have sufficient "grab" or "quickstick" in the adhesive. Too extensive additional cross-linking of the polyester by isocyanate groups lowers the plastic flow of the composition and reduces the number of points available for hydrogen bonding.

Where desired, I may employ fibrous paper backings instead of transparent film backings on which to coat my novel adhesives.

Where paper backing is employed I may pre-saturate the paper with the novel polyurethane compositions of my invention, and then coat one side of the sheet with a pressure sensitive adhesive mass, preferably one which is of the type described above as part of the present invention. For example, where polyurethane masses such as F through K in the preceding examples are to be used, the following saturants have been found to be quite effective:

|  | I | II |
|---|---|---|
| Castor Oil Diglycolate | 100 | 100 |
| Nacconate #310 |  | 1.25 |
| Hylene DMM | 3.2 |  |
| Polyvinylbutyral (10%) | 50 |  |
| Toluene | 20 | 50 |

The pick-up of the solutions above was 85–110% on 25 lb. Hollingsworth & Vose kraft, saturating type. The paper was dried and then cured for 20 minutes at 275° F. Physical values 110% pick-up for saturated paper made with saturant I above are as follows:

|  | Machine Direction | Cross Direction |
|---|---|---|
| Tensile | 55.2 | 9.1 |
| Elongation | 4.4 | 15.3 |

Obviously, many variations and changes may be made in the compositions disclosed without departing from the spirit and scope of the invention disclosed herein and therefore only such limitations should be imposed as are contained in the appended claims.

I claim:

1. A pressure sensitive adhesive having high solvent, ultraviolet, oxygen and ozone resistance and being strongly adherent to non-fibrous film surfaces except to itself which comprises:
    an isocyanate cross-linked reaction product of castor oil and diglycolic acid formed from 0.3 to 0.9 equivalent of acid to one of oil;
    said reaction product containing free hydroxyl groups and before cross-linking having a viscosity between 5,000 and 35,000 centipoises at 25° C., an acid number less than 30; a hydroxyl number between 40 and 90; and a molecular weight number average of from 1,200 to 2,100.

2. A pressure sensitive adhesive as in claim 1 wherein the acid to oil ratio of equivalents is 0.5 to 0.8 to 1.

3. A pressure sensitive adhesive as in claim 1 wherein the viscosity of said reaction product is between 8,000 and 25,000 centipoises at 25° C.

4. A pressure sensitive adhesive as in claim 1 wherein the acid number is below 10.

5. A non-narcissistic pressure sensitive adhesive sheet material which comprises:
    a flexible non-metallic backing sheet; and a coating on at least one side of said sheet of an isocyanate cross-linked reaction product of castor oil and diglycolic acid, said reaction product containing free hydroxyl groups and before cross-linking being formed from 0.3 to 0.9 equivalent of acid to one of oil and having a viscosity of between 5,000 and 35,000 centipoises at 25° C., an acid number below 30; a hydroxyl number between 40 and 90 and a molecular weight number average of from 1,200 to 2,100.

6. A pressure sensitive adhesive sheet material as in claim 5 wherein there is also present at least a small amount of a resinous tackifying agent substantially free of reactive hydrogen.

References Cited by the Applicant

UNITED STATES PATENTS

| | | | |
|---|---|---|---|
| 2,392,639 | 1/1946 | Brinker et al. | 260—22 |
| 2,763,624 | 9/1956 | Newell | 260—858 |
| 2,998,399 | 8/1961 | Petropoulous | 260—75 |

MURRAY TILLMAN, *Primary Examiner.*

J. C. BLEUTGE, *Assistant Examiner.*